United States Patent [19]

Meisner

[11] 4,300,087
[45] Nov. 10, 1981

[54] PORTABLE, RECHARGEABLE POWER SUPPLY

[75] Inventor: Alfred Meisner, Nuremburg, Fed. Rep. of Germany

[73] Assignee: Diehl GmbH & Co., Nuremburg, Fed. Rep. of Germany

[21] Appl. No.: 61,179

[22] Filed: Jul. 27, 1979

[30] Foreign Application Priority Data

Aug. 12, 1978 [DE] Fed. Rep. of Germany ....... 7824114

[51] Int. Cl.³ .................. H02J 7/00; H01M 10/46
[52] U.S. Cl. ......................... 320/2; 320/14; 320/5; 307/150
[58] Field of Search ......................... 320/2–5, 320/13, 14, 15, 56; 307/149, 150, 66

[56] References Cited

U.S. PATENT DOCUMENTS

| | | | |
|---|---|---|---|
| 2,555,630 | 6/1951 | Bishner | 320/14 X |
| 2,920,260 | 1/1960 | Goffstein | 320/2 X |
| 2,978,596 | 4/1961 | Robirds | 307/66 UX |
| 3,017,559 | 1/1962 | Mallory | 320/2 X |

Primary Examiner—Robert J. Hickey
Attorney, Agent, or Firm—Burns, Doane, Swecker & Mathis

[57] ABSTRACT

A portable power supply includes a rechargeable battery in a casing. Power is supplied from the battery to a socket by means of a D.C./A.C. voltage converter and a step-up transformer. When the socket is connected to an external source of power, the battery is charged by means of an additional winding in the transformer and a rectifier.

2 Claims, 1 Drawing Figure

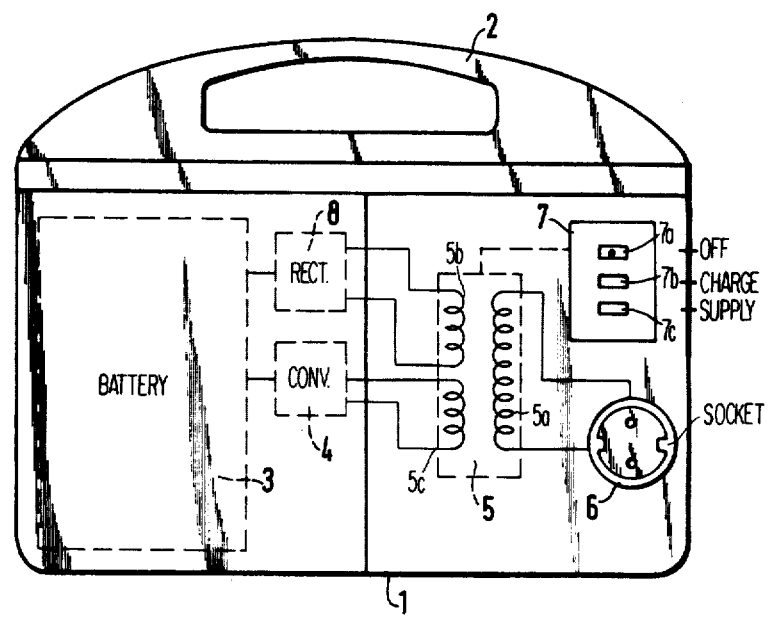

PORTABLE, RECHARGEABLE POWER SUPPLY

BACKGROUND OF THE INVENTION

The present invention relates to a portable, rechargeable appliance for the delivery of electrical power to a consumer.

It is often desirable to use appliances which operate at a standard network voltage, e.g., 220 volts, either in the yard or in connection with a hobby. Such appliances often can not be utilized due to the absence of any network voltage supply or because an extension cord of proper length is not available.

OBJECT AND BRIEF SUMMARY OF THE INVENTION

It is therefore an object of the present invention to provide a novel portable power source which will eliminate these disadvantages.

This objective is achieved by providing a rechargeable battery in a casing with a handle. The casing also includes a voltage converter, a transformer, and a standard socket for the delivery of an alternating current at a standard supply voltage. Switches for placing the power supply appliance in an operational or a charging mode can also be provided.

If such an appliance utilizes a battery of proper ampere-hour capacity, it will be able to deliver an electric current at any desired location, at least for a limited period of time.

In a further feature of the present invention, the transformer, which transforms the alternating voltage of the converter to a signal of proper voltage, contains a second winding which serves, in conjunction with a rectifier, to recharge the battery when the socket is connected to an external source of power. This specific design of the power supply appliance makes possible a saving in weight, a particularly important feature for a portable appliance. Also advantageous in connection with the present invention is the use of a 12-volt car battery.

BRIEF DESCRIPTION OF THE DRAWING

The present invention will now be explained in detail with reference to the drawing, which illustrates an embodiment of the invention.

DETAILED DESCRIPTION

A plastic casing 1 is equipped with a handle 2, and contains a 12-volt car battery 3. A voltage converter 4 serves to chop the D.C. signal from the battery and supplies an alternating voltage signal of desired voltage, e.g., 220 v/50 Hz, to a series-connected standard socket 6 by way of a transformer 5.

The transformer 5 includes a winding 5a connected to the socket 6 and a winding 5c connected to the voltage converter 4. During the supply of power from the battery 3 to the socket 5, the winding 5c functions as a primary winding and the winding 5a functions as a secondary winding, and the transformer 5 operates as a step-up transformer. The transformer 5 can also include another winding 5b connected to the battery 3 by means of a rectifier 8 to provide for charging of the battery 3 when the socket 6 is connected to an external source of power. During charging, the winding 5a functions as the primary winding and the winding 5b functions as a secondary winding and the transformer 5 operates as a step-down transformer.

A switch panel 7 includes a switch 7a for turning the appliance on and off. For example, the switch 7a may operate to open and close the current path in the winding 5a. A switch 7b for switching the appliance to the charging mode can control the current path in the winding 5b, and a switch 7c for placing the appliance in an operational mode can control the current path for the winding 5c.

The present invention may be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A portable, rechargeable power supply, comprising:
    a portable casing;
    a rechargeable battery located within said casing;
    a voltage converter for converting a D.C. output voltage from said battery into an A.C. voltage;
    a rectifier circuit for converting an A.C. input voltage into a D.C. voltage and supplying the D.C. voltage to said battery;
    a transformer having a first winding connected to said voltage converter, a second winding connected to said rectifier circuit, and a third winding operatively associated with each of said first and second windings;
    an input/output socket connected to said third winding; and
    switching means including a first switch for enabling said first and third windings of said transformer to supply an A.C. voltage from said voltage converter to said socket, and a second switch for enabling said second and third windings of said transformer to supply an A.C. voltage from said socket to said rectifier circuit to recharge said battery.

2. The portable, rechargeable power supply of claim 1 wherein said rechargeable battery is a 12-volt automobile battery.

* * * * *